United States Patent
Saito et al.

[15] 3,670,136
[45] June 13, 1972

[54] ELECTRIC DISCHARGE MACHINING METHOD AND APPARATUS

[72] Inventors: Nagao Saito; Kazuhiko Kobayashi, both of Nagoya, Japan

[73] Assignee: Mitsubishi Denki Kabushiki Kaisha, Chiyoda-ku, Tokyo, Japan

[22] Filed: Feb. 2, 1970

[21] Appl. No.: 7,898

[30] Foreign Application Priority Data

Feb. 4, 1969 Japan..................................44/8326

[52] U.S. Cl...........................................219/69 C, 219/69 S
[51] Int. Cl..................................................B23p 1/08
[58] Field of Search..................13/13; 219/69 C, 69 F, 69 G, 219/69 P

[56] References Cited

UNITED STATES PATENTS

| | | |
|---|---|---|
| 1,061,612 | 5/1913 | Heroult.......................................13/13 |
| 3,264,517 | 8/1966 | Ullman et al........................219/69 P |
| 3,439,145 | 4/1969 | Sennowitz...........................219/69 P |

*Primary Examiner*—R. F. Staubly
*Attorney*—Robert E. Burns and Emmanuel J. Lobato

[57] ABSTRACT

Upon electric-discharge machining a workpiece by intermittently applying pulse voltages across a gap between it and the opposed electrode, a pause time following each pulse voltage is adjusted by predetermined small incremental amounts in accordance with the voltage conditions developed across the gap.

7 Claims, 8 Drawing Figures

ELECTRIC DISCHARGE MACHINING METHOD AND APPARATUS

BACKGROUND OF THE INVENTION

This invention relates to an electric discharge machining method of and apparatus for machining a workpiece by intermittently applying pulse voltages across a working gap formed between the workpiece and the opposed working electrode with each pulse voltage followed by a pause time.

It is well known that in electric discharge machining methods comprising the step of applying across the working gap pulse voltages these pulse voltages are of the important electric requirements for determining the electric discharge machining characteristics. The requirements that should be met by the pulse involve a peak valve of a discharge current due to the pulse voltage, the pulse width of the voltage and a pause time following each pulse voltage. Among these requirements the peak value of the discharge current and the pulse width of the voltage directly affect the machining characteristics such as the roughness of the surface to be finished determined for the particular purpose, a ratio of consumption of a working electrode involved relative to an amount of workpiece material removed, a clearance or a lateral gap between the electrode and the workpiece etc. while the pause time affects the machining efficiency. Actually, the peak value of the discharge current and the pulse width of the pulse voltage are definitely determined by the machining characteristics inherent to a machining apparatus involved and to the initiation of the particular operation. However it has been common practice to preset suitably the pause time by the operator by deducing how much the pause time may shorten, that is to say, how much the machining efficiency may increase in accordance with the particular machining conditions, for example, the material of the workpiece, the material and configuration of the working electrode, the depth to which the workpiece is machined whether or not the working liquid is spouted into the working gap, etc. and on the basis of experience.

If the pause time is preset to be short the duty factor and therefore the mean working current will increase. This generally leads to an increase in machining efficiency. However, if the pause time is preset to be too short then an abnormal electric discharge it apt to occur and an unexpected result may be encountered. Thus the proper setting of this pause time is difficult and requires the operator to become considerably skillful.

SUMMARY OF THE INVENTION

Accordingly it is an object of the invention to provide a new and improved method for effecting electric discharge machining while the machining efficiency is always maintained high in operation.

It is another object of the invention to provide a new and improved method for effecting electric discharge machining with an efficiency always maintained high while a machining gap involved is effectively prevented from discharging abnormally.

The invention also has for its other objects to provide a new and improved electric discharge machining apparatus capable of accomplishing the objects as described in the preceding paragraphs.

The invention accomplishes the aforesaid objects by the provision of an electric discharge machining method comprising the steps of disposing a workpiece and a working electrode in opposed relationship to form a working gap therebetween, and intermittently applying across the working gap pulse voltages each followed by a pause time, the pulse voltages producing electric discharges for electric discharge machining the workpiece, characterized by the steps of sensing the state of the working gap on the basis of the presence of the electric discharge developed across the working gap during the application of each pulse voltage thereacross, and adjusting the pause time in accordance with the sensed result.

The presence of a normal state in the working gap may be determined by a sequence of a predetermined number of pulse voltages each including a pulse portion causing no electric discharge across the working gap during the application of each pulse voltage thereacross and the pause time decreases by a predetermined small amount. On the other hand, the presence of an abnormal state in the working gap may be determined by a sequence of a predetermined number of pulse voltages each causing an electric discharge across the working gap throughout the period of corresponds application and the pause time increases by a predetermined gap amount. In this way the pause time may be adjusted by the predetermined small incremental amounts.

In a preferred apparatus of the invention, there may be provided a first switching element for intermittently interrupting the power supply to the working gap to intermittently apply across the working gap pulse voltages each followed by a pause time, and adjusting means for adjusting the pause time in accordance with a voltage developed across the working gap.

The adjusting means may advantageously respond to a second switching element having a pair of operative positions one of which corresponds to the absence of electric discharge across the working gas and the other of which corresponds to both the presence of the electric discharge across the gap and the pause time.

BRIEF DESCRIPTION OF THE DRAWINGS

The invention will become more appararent from the following detailed description taken in conjunction with the accompanying drawings in which.

DESCRIPTION OF THE PREFERRED EMBODIMENTS

Figure 1:
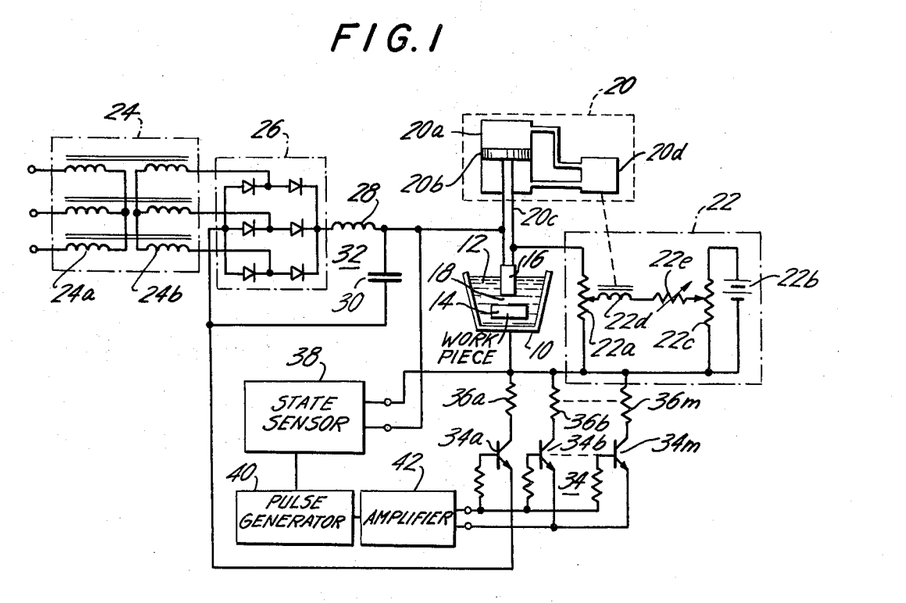
FIG. 1 is a schematic circuit diagram of an electric discharge machining apparatus embodying the principles of the invention.

Referring now to the drawings and FIG. 1 in particular, it is seen that an arrangement disclosed herein comprises a machining vessel 10 open at the upper end, a quantity of any suitable electrically insulating oil 12, such as kerosene, filling the vessel 10, a workpiece 14 suitably disposed within the insulating oil 12 in the vessel and a working electrode 16 movably suspendend from above and dipped into the insulating oil 12 with the lower end face thereof opposed to the workpiece 12 to form a working gap 18 therebetween. The working electrode 16 is supported by a support mechanism generally designated by the reference numeral 20.

As the electric discharge machining process proceeds the support mechanism 20 serves to move the electrode 16 toward the workpiece 12 in the well known manner to maintain the machining gap 20 substantially constant. The support mechanism 20 is shown in FIG. 1 as being of a hydraulic servo system including a hydraulic cylinder 20a, a piston 20b slidable within the cylinder, and a connecting rod 20c connecting the piston 20 to the working electrode 16. In order to control the hydraulic pressures within the cylinder 20a on both sides of the piston 18b the cylinder 20a is operatively coupled on both end portions to a control 18d as shown in FIG. 1. Such a hydraulic servo system is well known in the art and need not be described in detail. If desired, the hydraulic servo system may be replaced by any suitable electric servo system.

The control 20d is operatively associated with an electric control circuit generally designated by the reference numeral 22. The control circuit 22 may be of conventional construction as is shown in FIG. 1 as including a potentiometer 22a connected across the electrode 16 and the workpiece 14 to provide a detection signal V indicating the voltage across the gap 18, a source of direct current 22b having one terminal, in this case the negative terminal, connected to the workpiece 14, and a reference potentiometer 22c connected across the source 22b to provide a reference voltage Vs. A servo coil 22d is connected between the movable taps on both the potentiometers 22a and c through a series resistor 22c thereby to provide a difference signal corresponding to a difference between the detection and reference voltages V and Vs respectively. If desired, the control circuit may be of any suitable type other than the type illustrated. For the present purpose, it is sufficient that the servomechanism 20 cooperates with the control circuit 22 to maintain the machining gap 20 substantially constant in operation.

In order to supply electric energy to the working gap 18, a three-phase power transformer generally designated by the reference numeral 24 is provided including three primary windings 24a connected in a star configuration and three secondary windings 24b also connected in a star configuration. The primary windings 24a are adapted to be energized by a three-phase source of alternating current (not shown) having commercial frequency, and the secondary windings 24b are connected to alternating current (AC) input terminals of a three-phase full-wave rectifier 26. The rectifier 26 has one direct current (DC) output terminal connected to the connecting rod 20c and hence the electrode 16 through a reactor 28 and the other output terminal connected to the junction of the reactor 28 and the rod 20c through a capacitor 30 relatively high in capacitance. The reactor 26 and the capacitor 30 form a filter circuit 32 to smooth the rectified output from the rectifier 26. In the embodiment illustrated the positive side of the filter circuit 32 is connected to the working electrode 16 through the connecting rod 20c and the negative side thereof is connected to the workpiece 14 through a transistorized switching element generally designated by the reference numeral 34.

As shown in FIG. 1 the switching element 34 comprises a plurality of NPN-type transistors 34a, b, . . . . , m including respective emitter electrodes connected together to the negative side of the filter circuit 32, respective collector electrodes connected together to the workpiece 14 through respective collector resistors 36a, b, ..., m and respective base electrodes connected together through respective base resistors. The collector resistors 36a, b, ...., m serve to maintain the associated collector currents under their rated values as well as balancing those currents. The switching element 34 as above described serves to intermittently pass the DC output from the filter circuit 32 therethrough to provide a train of square pulse voltages in the manner as will be described hereinafter.

The number of the parallel transistors 34 generally depends upon the magnitude of current flowing through the working gap 18 and may be small for a low current flowing through the gap 18. For example, a single transistor may be used.

A state-of-gap sensor 38 is connected across the workpiece 14 and the connecting rod 20c and therefore the working electrode 16 to sense a voltage across the working gap 18 thereby to determine if the particular electric discharge across the gap is normal. If an abnormal discharge has been determined to occur in the working gap 18 the sensor 38 provides an instruction for setting intervals between the pulse voltages to be long. On the other hand, after the detector 38 has determined that normal discharge has continued for a predetermined period of time, it provides an instruction for setting the intervals between the pulse voltages to be short. This will be described in detail hereinafter. A pulse generator 40 is connected to the state sensor 38 to generate a train of pulses each followed by a pause time determined by the instruction from the detector. After having been amplified by an amplifier 42, the output or the train of pulses from the generator 40 is applied across the base and emitter sides of the plurality of transistors 34a, b, ...., m to turn simultaneously on or off all the transistors thereby to convert the dc output from the filter circuit 32 to a train of square pulses each followed by a controlled pause time. Then the train of square pulses is applied across the working gap 18 of the electric discharge machine and the workpiece 14.

Upon initiating a machining operation, the peak value and pulse width of a discharge voltage is first preset in accordance with the machining conditions such as the roughness of a surface to be finished, a clearance, a ratio of consumption of an electrode involved to an amount of workpiece material removed etc. preliminarily determined for the particular purpose. The peak value and pulse width of the discharge voltage remain unchanged within a limited machining time. According to the invention an initial pause time is first given and then the pause time is adjusted by predetermined amounts in accordance with the voltage across the working gap. Such discrete pause times are each designated by the reference character $\pi_i$ where $i$ is any integer. It is assumed that the greater the $i$ the longer the pause time $\tau_i$.

Figure 2:
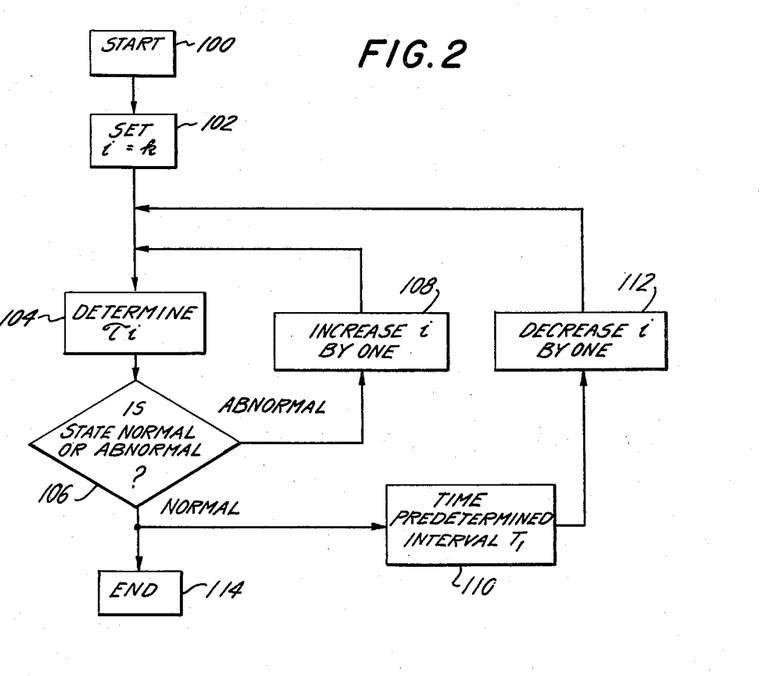
FIG. 2 is a logic flow chart useful in explaining the manner in which the pause time is adjusted by predetermined small incremental amounts.

The pause time can be controlled in accordance with a logic flow chart as shown in FIG. 2. Specifically, an electric discharge machining apparatus such as shown in FIG. 1 is started in block 100 while the suffix $i$ of the $\tau$ is set to an integer $k$ indicating the particular initial p value of the pause time in block 102. Then the particular pause time in this case $\tau_k$ is determined in block 104. In block 106 the state sensor 38 determines whether the pause time thus determined puts the working gap 18 in its normal or abnormal state as will be described hereinafter. If the presence of the abnormal state has been determined in block 106, block 108 is operated to add one to the pause number $i$ in this case $k$. Then a pause time with the suffix increased by one is determined in block 104 and the machining operation is now performed with the pause time increased by a predetermined incremental amount. Due to the fixed pulse width this increase in pause time causes a decrease in duty factor leading to a decrease in mean working current. Therefore, the machining operation tends to approach the normal mode. However, if with the increased pause time, the abnormal mode of operation still continues as determined in block 106 the process as above described is repeated to further increase the pause time by a predetermined incremental amount. In this way the pause time increases by predetermined small amounts until the abnormal state of the gap disappears.

After the abnormal state has been removed or if the block 106 has determined that the normal state is present in the working gap 18 then the block 110 begins to time a predetermined time interval of $T_1$ the normal mode. When it has timed out the time interval of $T_1$ for which gap 18 continued to be put in its normal state, the process goes to block 112 where $i$ decreases by one. Then block 104 determines a pause time $\tau_{i-1}$ decreased by a predetermined amount. Block 106 again determines if the now decreased pause time $\tau_{i-1}$ puts the working gap 18 in its abnormal state. If the abnormal state takes place in the gap 18 as determined by block 106, then blocks 108 and 104 return the pause time back to the just preceding value. On the contrary, if block 106 determines the presence of the normal state, block 112 again begins to time the time interval of $T_1$. When the normal state has continued for that interval of $T_1$ as determined by block 112, the pause time is further decreased by a predetermined amount in the same manner as above described. In this way the machining operation continues to be performed until a predetermined area of the workpiece is completed. At that time the operation ends in block 114.

From the foregoing it will be appreciated that even with the machining conditions varied, a trial and error operation as above described in conjunction with FIG. 2 can be repeated to automatically select a particular pause time providing always the optimum machining conditions. In other words, the optimum mean value of working current can be automatically selected under the particular machining conditions with the result that the machining efficiency becomes a maximum.

If the number of changes in pause time is larger, there is provided a pause time approximating more the optimum value. Also since the electric discharge machining operation is generally performed for a long time with respect to one workpiece the optimum machining conditions will relatively slowly change. Therefore, the predetermined time interval of $T_1$ as above described may be preferable long. For example, it may be in the order of minutes.

Figure 3:
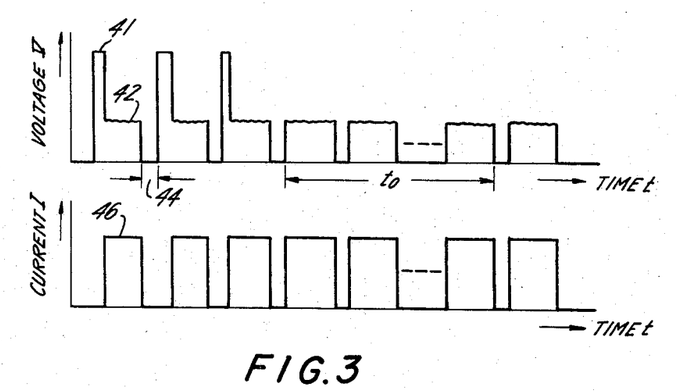
FIG. 3 is a waveform diagram illustrating waveforms of voltage and current developed between the workpiece and the working electrode shown in FIG. 1.

Referring now to FIG. 3, there are illustrated various waveforms of discharge voltage and current developed between a workpiece and a working electrode and resulting from variation in the machining conditions. It is seen in FIG. 3 that each of the first three waveforms of voltage V shown on the upper portion each includes a no-load voltage portion 41 followed by an arc voltage portion 42. Also each of the waveforms is followed by a pause time such as shown at 44 in FIG. 3. FIG. 3 also shows the remaining voltage waveforms each including only the arc voltage. The reference numeral 46 designates waveforms of current I corresponding to those voltage waveforms illustrated directly above the same. The no-load voltage portion 41 is developed across the working gap when no electric discharge occurs across the gap while the arc voltage portion 42 is developed across the gap when an electric discharge occurs across the latter. The occurrence of the no-load voltage portion 41 depends upon the dimension of the working gap and with the gap wide enough to prevent the occurrence of electric discharge, only the no-load portions are developed across the gap. On the contrary, the working gap being very small in dimension causes the arc voltage portions to be more developed thereacross.

Also the no-load voltage portion may tend to disappear in accordance with the particular maching conditions but not much dependent upon the dimension of the working gap. Eventually only the arc voltage portions remain developed across the gap leading to the abnormally machining state. Under the abnormal state only a considerably increase in dimension of the working gap can prevent the no-load voltage portions from disappearing. On the other hand, the occurrence of those voltage waveforms including the no-load voltage portion may be called the normally machining state.

Therefore the presence or the absence of the no-load voltage portion can determine the normal or abnormal state respectively. For example, if the state in which the no-load voltage portions occurs continues for a predetermined interval of time such as $T_1$ previously described in conjunction with FIG. 2, it can be determined that the normal state is present in the working gap. On the other hand, if the no-load voltage portions do not continuously occur for a predetermined interval of time $t_o$ as shown in FIG. 3 the gap can be determined to be in its abnormal state. In other words, a predetermined number of successive pulse voltages including the respective no-load voltage portions represent that the gap is in its normal state while a predetermined number of successive pulse voltages including only the respective arc voltage portions represent the abnormal state of the gap.

Figure 4:
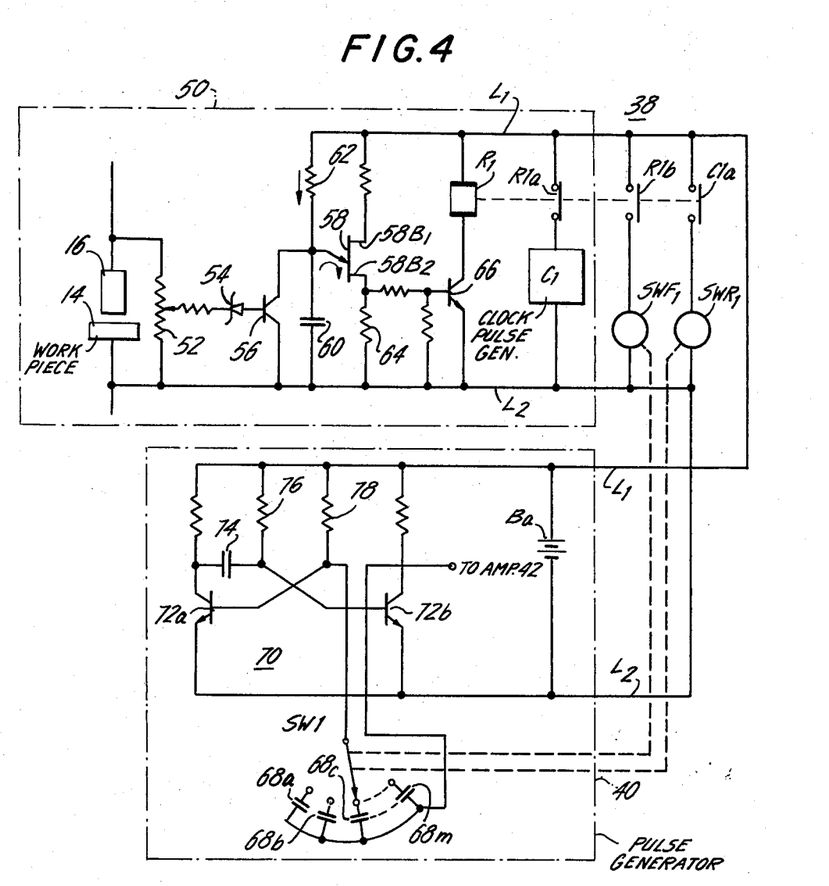
FIG. 4 is a circuit diagram of a state-of-gap sensor and a pulse generator constructed in accordance with the principles of the invention.

Referring now to FIG. 4, there is illustrated a circuit diagrams of one form of the state sensor and pulse generator 38 and 40 respectively shown in FIG. 1 and operative as above described. Within dotted block 50 there are disposed the workpiece 14 and the working electrode 16 as shown in FIG. 1 across which is connected a potentiometer 52 having an intermediate tap thereon coupled through a Zener diode 54 to an NPN type transistor 56 at the base electrode. The transistor 56 includes an emitter electrode connected to the workpiece 14 and a collector electrode connected to an emitter electrode E of a unijunction transistor 58. The transistor 58 includes a pair of base electrodes $B_1$ and $B_2$ and a capacitor 60 is connected across the collector and emitter electrodes of the transistor 56. The emitter electrode E of the unijunction transistor 58 is connected through a resistor 62 to a positive conductor $L_1$ leading to a DC source Ba and the first base electrode $B_1$ thereof is also coupled to the conductor $L_1$. The second base electrode $B_2$ of the transistor 66 is connected by a resistor 64 to a negative conductor $L_2$ connected to the source Ba and further coupled to a base electrode of an NPN type transistor 66. The transistor 66 includes an emitter electrode directly connected to the conductor $L_2$ and a collector electrode connected to the conductor $L_1$ through a relay R1. The relay R1 includes a set of normally closed contacts R1a connected across the conductors $L_1$ and $L_2$ through a clock pulse generator C1, and a set of normally open contacts R1b connected across the conductors $L_1$ and $L_2$ through a forward solenoid $SWF_1$ for a rotary switch as will be described later. The source Ba has connected thereacross a set of normally open contacts C1a and a reverse solenoid $SWR_1$ for the same switch serially connected to the contacts C1a.

The potentiometer 52 has the intermediate tap disposed thereon in such a position that, with the no-load current portion 50 as shown in FIG. 3 developed across the machining gap between the electrode and workpiece 16 and 14 respectively, the tap provides a voltage sufficient to fire the Zener diode 54 to supply a base current to the transistor 56 thereby to render it conductive. However the occurrence of the arc voltage such as shown at 42 in FIG. 3 across the working gap causes the tap to provide a voltage sufficient to maintain the Zener diode 62 and therefore the transistor 64 non-conductive. If the transistor 56 is in its nonconductive state the capacitor 60 is charged from the source Ba through the resistor 62. When the voltage on the capacitor 60 has reached a predetermined fixed magnitude determined by the characteristics of the unijunction transistor 58, the capacitor discharges to provide an impulsive voltage or pulse across the resistor 64. The impulsive voltage is applied to the transistor 66 to fire it leading to the energization of the relay R1 from the source Ba.

An interval of from the beginning of charge up to the beginning of discharge of the capacitor 60 determines the time constant of the capacitor and resistor 60 and 62 respectively. It is now assumed that the interval just described is preselected to equal the time $t_o$ as shown in FIG. 3. Under the assumed condition, if the absence of the no-load voltage portions 40 continues for that time $t_o$ then the relay R1 is energized to open the closed contacts R1a and close the open contacts R1b. The opening of the relay contacts R1a disconnects the clock generator C1 from the positive conductor $L_1$. That is, the clock generator C1 is reset to its inoperative position. When the relay R1 is in its de-energized position, the clock generator C1 is operated to generate a train of clock pulses with a repetition period of $T_1$. The generator C1 provides a contact closure type output to close its contacts C1a to permit the solenoid $SWR_1$ to be energized. It is noted that what is timed out by block 110 shown is FIG. 2 is equal to that pulse repetition period of $T_1$.

The solenoids $SWF_1$ and $SWR_1$ are operatively associated with a rotary switch SW1 including and a plurality of stationary contacts selectively engaged by a movable arm and connected to a plurality of capacitors 68a, b, c, ...., n different in capacitance from one another for the purpose as will be apparent hereinafter. Preferably the capacitors progressively increase in capacitance from the capacitor 68a toward the capacitor 68n. The forward solenoid $SWF_1$ responds to each pulse applied thereto to step the switch SW1 in the forward direction or in the counterclockwise direction as viewed in FIG. 4 whereby the movable arm is connected to that capacitor having a higher capacitance. On the other hand, the reverse solenoid $SWR_1$ responds to each pulse applied thereto to step the switch SW1 in the reverse direction or in the clockwise direction. This causes the movable switch arm to engage that capacitor less in capacitance.

FIG. 4 also shows an astable multivibrator of conventional construction generally designated by the reference numeral 70. The multivibrator 70 includes a pair of NPN type transistors 72a and b having emitter electrodes connected together to the negative conductor $L_2$ and collector electrodes coupled together to the positive conductor $L_2$. The collector electrode of the transistor 72a is connected through a capacitor 74 to the base electrode of the transistor 72b and also through the conductor $L_1$ through a resistor 76. The base electrode of the transistor 72a is connected to the conductor $L_1$ through a resistor and also directly connected to the movable arm of the switch SW1. The collector electrode of the transistor 72b is connected to all the capacitors 68a, b, ...., n and provides the output of the pulse generator 40 connected to the amplifier 42.

The astable multivibrator 70 produces a train of pulses having a pulse width determined by the time constant of the capacitor 74 and resistor 76 and a pause time determined by the time constant of the resistor 78 and that capacitor 68 connected thereto through the movable arm of the switch SW1.

While the multivibrator 70 is shown in FIG. 4 as including the single capacitor 74 it is to be understood that the capacitor 74 may be repaced by a plurality of parallel capacitors adapted to be selectively connected between the collector and base electrodes respectively of the transistors 72a and b. If desired, several tens of such capacitors may be employed. It is also to be understood that the switch SW1 can step only along a predetermined number of the stationary contacts in either of the forward and reverse direction and is prevented from rotating beyond the end contacts in response to a further pulse or pulses applied to either of its solenoids $SWF_1$ and $SWR_1$.

The arrangement as illustrated in FIG. 4 is operated as follows: If the machining state becomes abnormal then relay R1 is energized to close the contacts R1b as above described. The closure of the contacts R1b causes the forward solenoid $SWF_1$ to be energized to step forwardly the switch SW1 by one position whereupon the movable arm thereof disengages from that capacitor 68 previously engaged thereby and engages the adjacent capacitor higher in capacitance. This cause the pause time to increase by a predetermined incremental amount. The relay R1 is deenergized upon completing discharge of the capacitor 60. The opening of the contacts R1a ensures that the clock generator C1 is in its inoperative R position. If the abnormal state under which the no-load voltage portions 40 are not developed across the working gap 18 continues within the abovementioned time interval of $t_o$ after the completion of discharge of the capacitor 60, the relay R1 is again energized to further increase the pause time by a predetermined incremental amount in the same manner as above described. In this way the pause time increases by the predetermined incremental amounts until the abnormal state disappears.

Once the normal-state has been restored the relay R1 is deenergized to close its contacts R1a. Then if the normal state continues for the abovementioned time interval of $T_1$ the clock generator C1 provides an output or a clock pulse to close its contacts C1a to permit the energization of the reverse solenoid $SWR_1$. Therefore, the switch SW1 steps reversely by one position to engage the movable arm thereof with that capacitor 68 less in capacitance resulting a decrease in pause time by a predetermined amount. A further continuation of the normal state for the interval of $T_1$ after the pause time has increased causes similarly the switch SW1 to step reversely by one position whereby the pause time further decreases by a predetermined amount.

In this way, the pause time is adjusted by the predetermined amounts so that the mean working current is controlled to its optimum value in accordance with the particular machining state.

It is understood that the predetermined amounts by which the pause time is adjusted are not required to be equal to one another.

In the event that the abnormal state does not disappear only through an increase in pause time by the single incremental amount, the arrangement of FIG. 4 may be operated to increase the pause time by two or more incremental amounts even though the single incremental amount of the pause time would have been actually optimum upon reaching the normal state. This results in time being wasted until the optimum value is restored.

Figure 5:
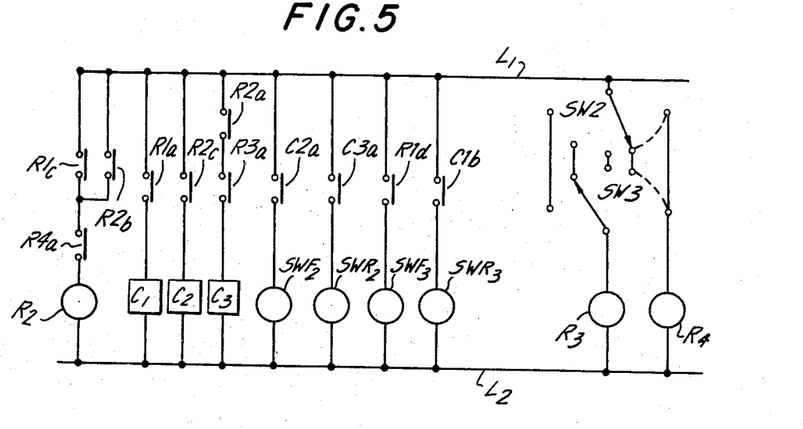
FIG. 5 is a schematic circuit diagram of a modification of the arrangement shown in FIG. 4.

FIG. 5 illustrates a modification of the invention effective for decreasing the waste of time just described. The arrangement illustrated is operative to provide a maximum possible pause time once in the event of varying the pause time by a single, relatively large amount in response to the occurrence of the abnormal state and then to decrease the pause time stepwise at predetermined time intervals to a pause time longer by a single predetermined amount than that pause time with which the abnormal state occurred. In addition to the state-sensing circuit 50 and the pulse generator 40 shown in FIG. 4, the arrangement comprises, a relay R2 connected through normally open contacts R1c of the relay R1 and normally closed contacts R4a of a relay R4 across the positive and negative conductor $L_1$ and $L_2$ with holding, normally open contacts R2b thereof parallel to the contacts R1c. A pair of relays R3 and R4 are connected in parallel circuit relationship and between the conductors $L_1$ and $L_2$ through serially connected rotary switches SW2 and SW3. The switches SW2 and SW3 each include a plurality of stationary contacts $S_1, S_2, S_3, \ldots, S_m$ selectively engaged by its own movable arm with each of the contacts of one of the switches connected to the corresponding contact of the other switch. The switch SW2 is arranged to interlock with the abovementioned rotary switch SW1.

In addition to the abovementioned clock generator C1 connected across the conductor $L_1$ and $L_2$ through the normally closed contacts R1a, a pair of clock pulse generators C2 and C3 are connected across the conductors $L_1$ and $L_2$ through normally open contacts R2c of the relay R2 and serially connected, normally closed contacts R2a and R3a of the relays R2 and R3 respectively. The clock generators C1, C2 and C3 generate trains of pulses having repetition periods of $T_1$, $T_2$ and $T_3$ respectively.

In order to step the switch SW2 in either of the forward and reverse directions, forward and reverse solenoids $SWF_2$ and $SWR_2$ are connected across the conductors $L_1$ and $L_2$ through normally open contacts C2a and C3a of the clock generators C2 and C3 respectively while solenoids $SWF_3$ and $SWR_3$ are similarly connected through normally open contacts R1d and C1b of the relay R1 and generator C1 to step the switch SW3 in either of the forward and reverse directions. It is again assumed that the forward direction is directed from the contact $S_1$ toward the contact $S_m$ corresponding to a maximum pause time. Those solenoids are identical in operation to the solenoids $SWF_1$ and $SWR_1$ as shown in FIG. 4.

Figure 6:
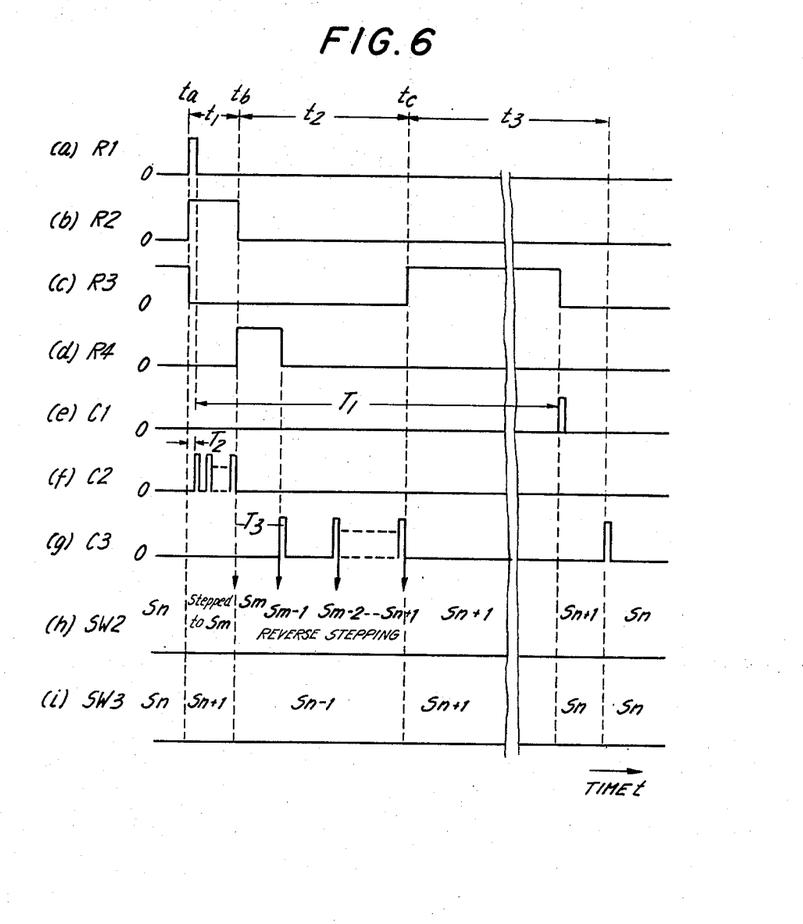
FIG. 6 is a view illustrating waveforms developed in the arrangement shown in FIG. 5.

The operation of the arrangement as above described will now be described with reference to FIG. 6 wherein there are various waveforms developed in the arrangement or the operative position of the components R1, R2, R3, C1, C2, C3, SW2 and SW3. In FIG. 6, those components are shown as being at predetermined high levels when energized and at zero level when de-energized.

Now assuming that the working gap is in its normal state, the switches SW2 and SW3 are at the same contact position $S_n$. Then if the gap is brought into its abnormal state at a time point of $t_a$ (see FIG. 6) the relay R1 is energized as above described in conjunction with FIG. 3. Thereby the contacts R1c are closed to permit the relay R2 to be energized. The energization of the relay R2 causes the clock generator C2 to be started through the closure of the contacts R2c. Then the capacitor 60 (see FIG. 4) has been discharged whereupon the relay R1 is reset to its inoperative position. It is noted that FIG. 6 illustrates the operation of the arrangement as shown in FIG. 5 on the assumption that the abnormal state has been removed after that resetting of the relay R1. When energized, the clock generator C2 is operated to intermittently close the contacts C2a with the period of $T_2$ (see (f) in FIG. 6) to cause the forward solenoid $SWF_2$ to be intermittently energized with the result that the interlocking switches SW1 and SW2 step to the contact $S_m$ to provide a maximum pause time. That is, a time inverval of $t$ (see FIG. 6) has elapsed from the time point $t_a$ at which the abnormal state occurred until the contact $S_m$ is reached (see (h) in FIG. 6).

On the other hand, the energized relay R1 closes its contacts R1d to cause the energization of the forward solenoid SWF$_3$ of the switch SW3 whereby the switch SW3 steps by one position reaching the contact $S_{n+1}$ (see (i) in FIG. 6). When the switch SW2 has reached the contact $S_m$ at a time point of $t_b$ or the end of the time interval of $t_1$ the relay R4 is energized to open its contacts R4a leading to a de-energization of the relay R2. As a result, the clock generator C2 ceases to be operated and instead the clock generator C3 begins to be operated to intermittently close its contacts C3a with the period of $T_3$ (see (g) in FIG. 6). This causes the reverse solenoid SWR$_2$ to be energized at time intervals of $T_3$ to step the rotary switches SW1 and SW2 in the reverse direction. Then a time interval of $t_2$ (see FIG. 6) has elapsed from the time point of $t_b$ to a time point of $t_c$ at which the switches SW2 and SW3 are assumed to reach the contact $S_{n+1}$ together. Therefore the relay R3 is energized to open its contacts R3a thereby to stop the operation of the clock generator C3. The present contact $S_{n+1}$ leads the previous contact $S_n$ by one position. Thus the pause time has increased by a single predetermined incremental amount.

Thus it will be appreciated that the abnormal state is effectively eliminated during the abovementioned increase in pause time to its maximum value corresponding to the contact $S_m$ and during the reversion of the pause time to the contact $S_{n+1}$ as above described. This eliminates the necessity of consuming a long time for setting the succeeding pause time and also causes a decrease in waste of control.

It is now assumed that the working gap is held in its normal state for the time interval of $T_1$ after the relay R1 has been reset to its inoperative position. Then the clock generator C1 provides an output (see (e) in FIG. 6) to close its contacts C1b to step the switch SW3 in the reverse direction by one position while at the same time the relay R3 is de-energized. The de-energization of the relay R3 causes its contacts C3a to be closed to operate the clock generator C3. Therefore the generator C3 provides its output to close its contacts C3a to cause the switches SW1 and SW2 to reversely step by one position with the result that the pause time decreases by a single predetermined amount.

Figure 7:
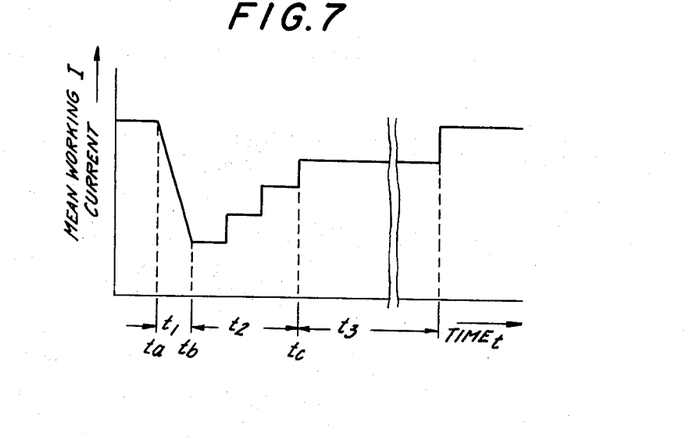
FIG. 7 is a graph plotting the mean machining current against time for the arrangement shown in FIG. 5.

FIG. 7, wherein the axis of ordinates represents a current and the axis of abscissas represents time, illustrates the mean machining current varied during the control of the pause time as above described in conjunction with FIGS. 5 and 6.

It has been found that the pulse repetition periods of $T_1$ and $T_3$ are preferably above 1 minute and of from 1 to 10 seconds respectively while $T_2$ is selected to be under 1 second so as to provide to the switches a stepping speed as high as possible because they are required to be rapidly operated. However, it is to be understood that the fingers just specified of the repetition periods are not necessarily definitive. This is because it may be better to vary these figures in accordance with the materials of the workpiece and the working electrode, the type of bore to be machined such as through and bottomed bores, etc.

Figure 8:
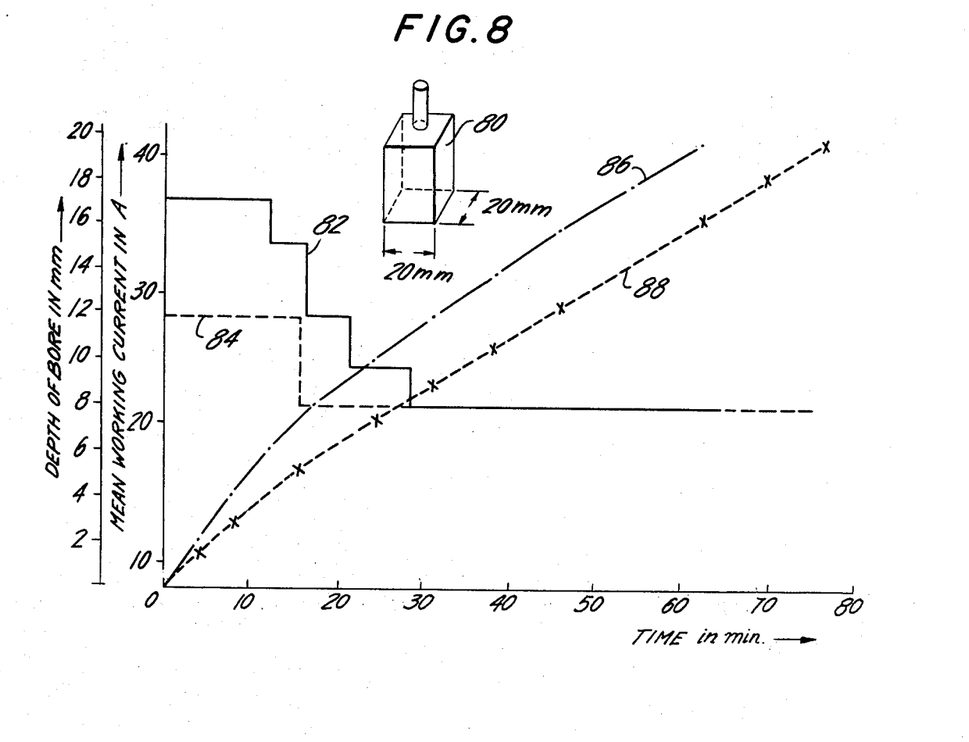
FIG. 8 is a graph plotting various machining parameters against time for the apparatus shown in FIG. 1.

FIG. 8 shows the results of experiments conducted with a practical apparatus according to the invention and also a working electrode 80 used in the experiments. As shown, the electrode 80 was formed of graphite into a square cross-section having one side 20mm long. Curves 82 and 84 plot the mean working current $i$ in amperes (in ordinates) against a machining time in minutes (in abscissas) and curves 86 and 88 plot a depth of bore $d$ in millimeters as a function of the machining time. Curves 82 and 86 indicate the invention while curves 84 and 88 indicate the prior-art practice.

From FIG. 8 it is seen that the invention finely selected the mean working current with an increase in depth of bore as compared with the prior art practice. As a result, the machining speed is high and therefore the machining time decreases.

Further it is to be noted that the fine selection of the mean working current is automatically accomplished. Once the fundamental machining conditions such as the peak value and pulse width of a discharge current involved provided by desired roughness of a surface to be finished, a ratio of consumption of an electrode used to an amount of workpieces material removed determined for the particular purpose have been preset the machining is continuously effected with a high degree of machining efficiency without the necessity of effecting any manual adjustment after the machining conditions have been set and also without the skillfulness of the operator.

What we claim is:

1. An electric discharge machining apparatus comprising, means for holding a workpiece and a working electrode disposed in opposed relationship to said workpiece to form a working gap therebetween, means including said electrode for applying a voltage across said gap comprising a switching element for intermittently interrupting the power supply to said working gap to apply across said working gap pulse voltages each followed by a pause time which is variable, means for variably adjusting individual pause times in dependence upon working voltages across said working gap, a second switching element responsive to no occurrence of electric discharge across said working gap due to the application of said pulse voltages thereacross in one operative position and responsive to both the occurrence of electric discharge across said working gap due to the application of said pulse voltages thereacross and the presence of said pause time in another operative position, and said adjusting means comprising means responding to said another operative position of said second switching element to variably adjust said pause time.

2. An electric discharge machining apparatus comprising, means for holding a workpiece and a working electrode disposed in opposed relationship to said workpiece to form a working gap therebetween, means including said electrode for applying a voltage across said gap comprising, switching element for intermittently interrupting the power supply to said working gap to apply across said working gap pulse voltages each followed by a pause time, means for adjusting said pause time in accordance with voltages across said working gap, a second switching element responsive to no occurrence of electric discharge across said working gap due to the application of said pulse voltages thereacross in one operative position and responsive to both the occurrence of electric discharge across said working gap due to the application of said pulse voltages thereacross and the presence of said pause time in another operative position, and actuating means responsive to the consecution of a predetermined number of the pulse voltages putting said second switching element in the one operative position to control said adjusting means to decrease said pause time.

3. An electric discharge machining apparatus comprising means for holding a workpiece and a working electrode disposed in opposed relationship to said workpiece to form a working gap therebetween, means including said electrode for applying a voltage across said gap comprising a switching element for intermittently interrupting the power supply to said working gap to apply across said working gap pulse voltages each followed by a pause time, means for adjusting said pause time in accordance with voltages across said working gap, a second switching element responsive to no occurrence of electric discharge across said working gap due to the application of said pulse voltages thereacross in one operative position and responsive to both the occurrence of electric discharge across said working gap due to the application of said pulse voltages thereacross and the presence of said pause time and operable to another operative position, and actuating means responsive to the sequence of a predetermined number of the pulse voltages operating said second switching element to said another operative position to control said adjusting means to increase said pause time.

4. An electric discharge machining apparatus comprising, means for holding a workpiece and a working electrode disposed in opposed relationship to said workpiece to form a working gap therebetween, means including said electrode for applying a voltage across said gap comprising a switching element for intermittently interrupting the power supply to said working gap to apply across said working gap pulse voltages each followed by a pause time, means for adjusting said pause time in accordance with voltages across said working gap, a second switching element responsive to no occurrence of electric discharge across said working gap due to the application of said pulse voltages thereacross in one operative position and responsive to both the occurrence of electric discharge across said working gap due to the application of said pulse voltages thereacross and the presence of said pause time to be put in another operative position, first actuating means responsive to a sequence of a predetermined number of the pulse voltages operating said second switching element to the one operative position to control said adjusting means to decrease said pause time and second actuating means responsive to a sequence of a predetermined number of the pulse voltages operating said second switching element to said another operative position to control said adjusting means to increase said pause time.

5. An electric discharge machining apparatus comprising, means for holding a workpiece and a working electrode disposed in opposed relationship to said workpiece to form a working gap therebetween, means including said electrode for applying a voltage across said gap comprising a switching element for intermittently interrupting the power supply to said working gap to apply across said working gap pulse voltages each followed by a pause time, means for adjusting said pause time in accordance with voltages across said working gap, a second switching element responsive to no occurrence of electric discharge across said working gap due to the application of said pulse voltages thereacross in one operative position and responsive to both the occurrence of electric discharge across said working gap due to the application of said pulse voltages thereacross and the presence of said pause time in another operative position, first actuating means responsive to a sequence of a predetermined number of the pulse voltages putting said second switching element in said one operative position to control said adjusting means to decrease said pause time, and second actuating means responsive to a sequence of a predetermined number of the pulse voltages putting said second switching element in said another operative position to control said adjusting means to increase said pause time, and said adjusting means having means responding to each of the operations of either of said first and second actuating means to be controlled by a predetermined amount.

6. An electric discharge machining apparatus comprising, means for holding a workpiece and a working electrode disposed in opposed relationship to said workpiece to form a working gap therebetween, means including said electrode for applying a voltage across said gap comprising a switching element for intermittently interrupting the power supply to said working gap to apply across said working gap pulse voltages each followed by a pause time, means for adjusting said pause time in accordance with voltages across said working gap, a second switching element responsive to no occurrence of electric discharge across said working gap due to the application of said pulse voltages thereacross in one operative position and responsive to both the occurrence of electric discharge across said working gap due to the application of said pulse voltages thereacross and the presence of said pause time in another operative position, first actuating means responsive to holding of said second switching element in said another operative position for a predetermined time interval to control said adjusting means to increase said pause time, and second actuating means responsive to an increase in pause time to a predetermined value through the operation of said first actuating means to control said adjusting means to decrease said pause time.

7. An electric discharge machining apparatus comprising, means for holding a workpiece and a working electrode disposed in opposed relationship to said workpiece to form a working gap therebetween, means including said electrode for applying a voltage across said gap comprising a switching element for intermittently interrupting the power supply to said working gap to apply across said working gap pulse voltages each followed by a pause time, means for adjusting said pause time in accordance with voltages across said working gap, a second switching element responsive to no occurrence of electric discharge across said working gap due to the application of said pulse voltages thereacross in one operative position and responsive to both the occurrence of electric discharge across said working gap due to the application of said pulse voltages thereacross and the presence of said pause time in another operative position, first actuating means responsive to holding of said second switching element in said another operative position for a predetermined time interval to control said adjusting means to increase said pause time, and second actuating means responsive to an increase in pause time to a predetermined value through the operation of said first actuating means to control said adjusting means to decrease said pause time, an amount by which the pause time increased by said first actuating means is larger than an amount by which the pause time is decreased by said second actuating means.

* * * * *